United States Patent
Yun et al.

(10) Patent No.: US 9,388,727 B2
(45) Date of Patent: Jul. 12, 2016

(54) METHOD FOR CONTROLLING REGENERATION OF DIESEL PARTICULATE FILTER IN CONSTRUCTION MACHINERY

(71) Applicant: Doosan Infracore Co., Ltd., Incheon (KR)

(72) Inventors: Hong Cheol Yun, Gyeonggi-do (KR); Yun Jung Choi, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 202 days.

(21) Appl. No.: 14/364,968

(22) PCT Filed: Dec. 5, 2012

(86) PCT No.: PCT/KR2012/010483
§ 371 (c)(1),
(2) Date: Jun. 12, 2014

(87) PCT Pub. No.: WO2013/115475
PCT Pub. Date: Aug. 8, 2013

(65) Prior Publication Data
US 2014/0331858 A1    Nov. 13, 2014

(30) Foreign Application Priority Data
Jan. 30, 2012 (KR) ............... 10-2012-0008930

(51) Int. Cl.
*F01N 9/00* (2006.01)
*B01D 46/00* (2006.01)
*F01N 3/023* (2006.01)

(52) U.S. Cl.
CPC ............ *F01N 9/002* (2013.01); *B01D 46/0057* (2013.01); *F01N 3/0232* (2013.01); *F01N 2900/1606* (2013.01); *Y02T 10/47* (2013.01)

(58) Field of Classification Search
CPC . F01D 9/002; F01N 2900/1606; Y02T 10/47; B01D 46/057
See application file for complete search history.

(56) References Cited

U.S. PATENT DOCUMENTS 8,316,637 B2 * 11/2012 Iwashita .............. B01D 53/944
60/295
8,615,990 B2 * 12/2013 Wilhelm ............... F01N 3/0253
60/285

(Continued)

FOREIGN PATENT DOCUMENTS

EP          2314851 A1    4/2011
JP       2005-163604      6/2005

(Continued)

OTHER PUBLICATIONS

European Search Report for European Application No. 12867384.5 dated Aug. 4, 2015, 8 pages.

(Continued)

*Primary Examiner* — Amber R Orlando
(74) *Attorney, Agent, or Firm* — John D. Veldhuis-Kroeze; Westman, Champlin & Koehler, P.A.

(57) ABSTRACT

The present disclosure relates to a method for controlling regeneration of diesel particulate filter in construction machinery. The regeneration controlling method for the diesel particulate filter of construction machinery according to the present disclosure includes: a first active generation operation of actively regenerating a diesel particulate filter (DPF) according to a predetermined first active regeneration schedule when a quantity of soot inside the DPF within is a predetermined allowance section; and a second active regeneration operation of actively regenerating the diesel particulate filter according to a second active regeneration schedule, which is different from the first active regeneration schedule, according to the quantity of soot when the quantity of soot exceeds the allowance section.

6 Claims, 1 Drawing Sheet

(56) References Cited

U.S. PATENT DOCUMENTS

| | | | |
|---|---|---|---|
| 8,973,351 B2 * | 3/2015 | Shibutani | 60/285 |
| 2005/0223701 A1 * | 10/2005 | Sato | F01N 3/0235 60/295 |
| 2008/0163609 A1 * | 7/2008 | Satou | B01D 53/944 60/287 |
| 2010/0242449 A1 | 9/2010 | Paterson | |
| 2012/0180463 A1 * | 7/2012 | Oohashi | B01D 46/0057 60/297 |
| 2012/0288410 A1 * | 11/2012 | Takayanagi | F01N 9/002 422/105 |
| 2013/0133315 A1 * | 5/2013 | Shibutani | F01N 9/002 60/311 |

FOREIGN PATENT DOCUMENTS

| | | | |
|---|---|---|---|
| JP | 2006037925 A | | 2/2006 |
| JP | WO2011049137 | * | 4/2011 |
| JP | 2011157924 A | | 8/2011 |
| KR | 10-0836999 | | 6/2008 |
| KR | 10-2008-0087469 | | 10/2008 |
| KR | 10-2009-0063932 | | 6/2009 |
| KR | 1020110062127 | | 6/2011 |
| KR | 1020110074845 | | 7/2011 |
| WO | 2010104422 A1 | | 9/2010 |

OTHER PUBLICATIONS

Chinese Office Action for Chinese Application No. 201280045802.3 dated Aug. 25, 2015, 6 pages.

Search Report dated Mar. 18, 2013 and written in Korean with English translation for International Patent Application No. PCT/KR2012/010483 filed Dec. 5, 2012, 5 pages.

* cited by examiner

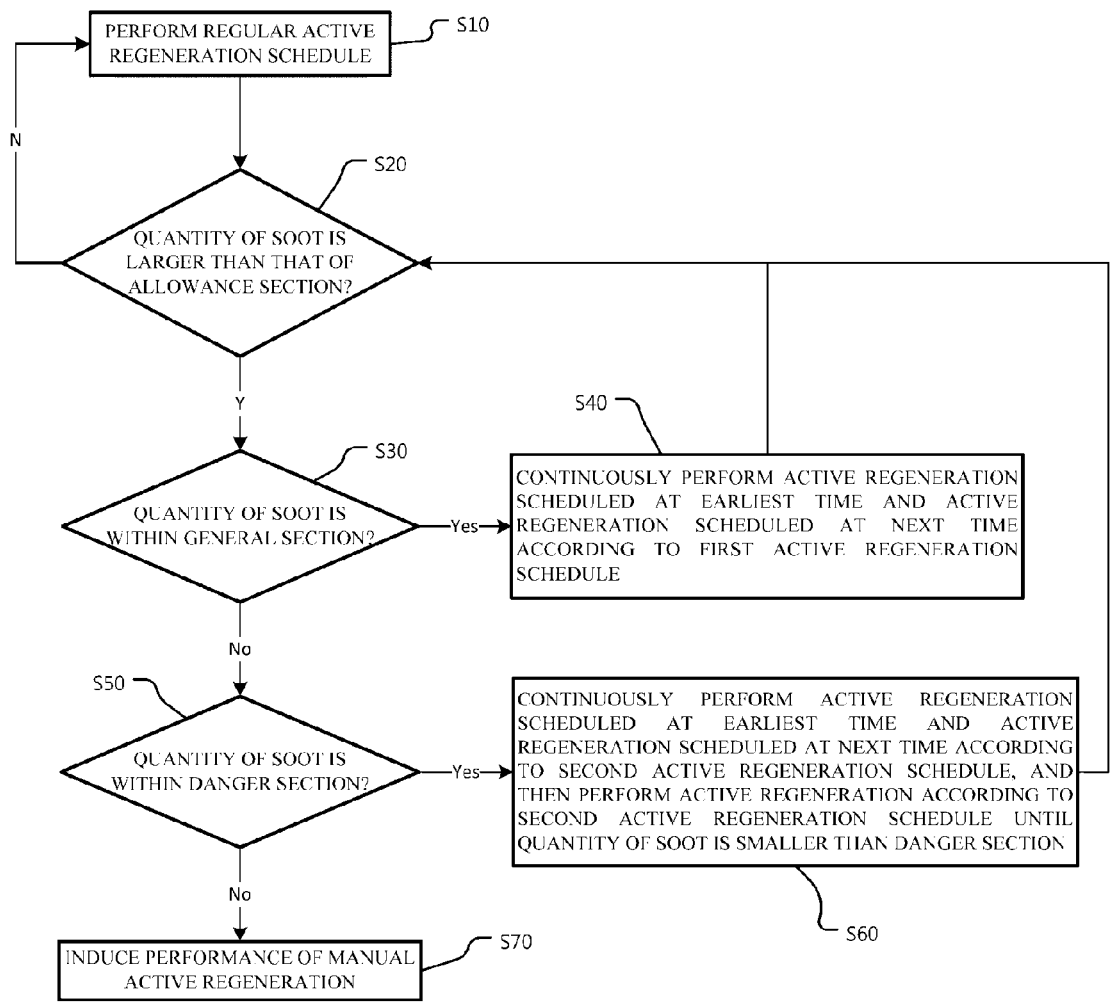

METHOD FOR CONTROLLING REGENERATION OF DIESEL PARTICULATE FILTER IN CONSTRUCTION MACHINERY

CROSS-REFERENCE TO RELATED APPLICATION

This Application is a Section 371 National Stage Application of International Application No. PCT/KR2012/010483, filed Dec. 5, 2012 and published, not in English, as WO 2013/115475 on Aug. 8, 2013.

FIELD OF THE DISCLOSURE

The present disclosure relates to a method for controlling regeneration of diesel particulate filter in construction machinery, and more particularly, to a method for controlling regeneration of diesel particulate filter in construction machinery in which a regeneration schedule of a particulate filter is actively changed according to the quantity of soot.

BACKGROUND OF THE DISCLOSURE

A technique of installing a diesel particulate filter and the like in an exhaust path of a diesel engine as an exhaust gas purifying device (post-processing device), and performing purifying processing on the exhaust gas discharged from the diesel engine through the diesel particulate filter and the like is known. The aforementioned diesel particulate filter is abbreviated to a "DPF" hereinafter.

Construction machinery includes a diesel engine and a hydraulic pump, and the diesel engine outputs power to drive the hydraulic pump, and the hydraulic pump discharges hydraulic oil so as to operate a hydraulic circuit.

Exhaust gas is unavoidably discharged while driving the diesel engine, and the exhaust gas contains nitrogen oxide (NOx), of which the nitrogen oxide causes pollution by negatively affecting the atmospheric environment. In order to solve the problem, the aforementioned DPF is used. The DPF is installed inside an exhaust gas muffler in typical construction machinery.

In the meantime, soot of particulate generated by incomplete combustion of an engine is accumulated in the DPF. The soot degrades performance of the DPF and increases back pressure of the exhaust gas muffler, which degrades performance of the engine. Accordingly, in order to maintain performance of the DPF and the engine, soot needs to be removed.

When a temperature of exhaust gas is high, soot is naturally combusted and removed. The removal of the soot is referred to as a natural regeneration. However, when the aforementioned natural regeneration is not properly performed at an appropriate time, the soot eventually needs to be forcibly removed, and such a removal of the soot is referred to as active regeneration.

For the active regeneration, a method of forcibly increasing a temperature of exhaust gas by forcibly increasing an output of an engine or forcibly combusting exhaust gas at a temperature for removing soot by injecting fuel to exhaust gas of which a temperature is forcibly increased.

The active regeneration may be scheduled by a program, however, the active regeneration according to the schedule by the program is not efficient.

The problem of the active regeneration by the program in the related art will be described in more detail.

It is necessary to differently set an active regeneration time for each type of construction machinery, and it is necessary to differently set an active regeneration time for each work environment in which construction machinery is operated.

Further, there are various controls, such as an engine operation time control, a driving distance control, a fuel usage quantity control, a DPF differential pressure sensor control, and a simulating control, and the active regeneration is scheduled for each control, and a schedule of advent active regeneration among several active regeneration schedules is selected and the corresponding active regeneration is performed in an electronic control unit (ECU).

That is, in the related art, without considering the quantity of soot after performing the active regeneration, the active regeneration fails due to a shortage in the quantity of load or the quantity of temperature during performance of the regeneration or the active regeneration is performed only at a set time even after a starting is off, such that a problem of causing damage to the DPF is generated.

Accordingly, a method of controlling the active regeneration of the DPF considering fuel efficiency while maintaining performance of the DPF and performance of the engine is demanded.

CITATION LIST

Patent Document (Patent Document 1) Korean Patent Application Laid-Open No. 10-2011-0074845
(Patent Document 2) Korean Patent Application Laid-Open No. 10-2011-0062127
Patent Documents 1 and 2 are not directly related to the present disclosure, but describe a technique related to a diesel particulate filter (DPF) removing nitrogen oxide (NOx) discharged from a diesel engine as a close technical field.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to provide a method for controlling regeneration of diesel particulate filter in construction machinery, which performs regular active regeneration, and controls so as to actively regenerate the DPF by measuring the quantity of soot and actively changing a schedule of an active regeneration of the next turn according to the quantity of soot.

A technical object to be achieved in the present disclosure is not limited to the aforementioned technical objects, and another not-mentioned technical object will be obviously understood by those skilled in the art from the description below.

An exemplary embodiment of the present disclosure provides a method for controlling regeneration of diesel particulate filter in construction machinery including: a first active generation operation of actively regenerating a diesel particulate filter (DPF) according to a predetermined first active regeneration schedule when a quantity of soot inside the DPF is within a predetermined allowance section; and a second active regeneration operation of actively regenerating the diesel particulate filter according to a second active regeneration schedule, which is different from the first active regeneration schedule, according to the quantity of soot when the quantity of soot exceeds the allowance section.

Further, the second active regeneration operation of the regeneration controlling method for the diesel particulate filter of construction machinery according to the present disclosure may include a first active regeneration schedule adjusting operation of performing active regeneration scheduled at the earliest time according to the first active regeneration schedule when the quantity of soot is within the general section larger than that of the allowance section.

Further, the second active regeneration operation of the regeneration controlling method for the diesel particulate filter of construction machinery according to the present disclosure may include a second active regeneration schedule adjusting operation of performing an active generation until the quantity of soot is smaller than that of the danger section according to a second active regeneration schedule set to be earlier than the first active regeneration schedule when the quantity of soot is within the danger section larger than that of the general section.

Further, the second active regeneration operation of the regeneration controlling method for the diesel particulate filter of construction machinery according to the present disclosure may include a manual active regeneration performance inducing operation of inducing a manual active regeneration when the quantity of soot is larger than that of the danger section.

In the second active regeneration schedule adjusting operation of the regeneration controlling method for the diesel particulate filter of construction machinery according to the present disclosure, active regeneration of the earliest time according to the second active regeneration schedule may be performed, active regeneration scheduled for the next turn of the active regeneration of the earliest time may be advanced and continuously performed according to the second active regeneration schedule, and thereafter the second active regeneration schedule may be adjusted so that earliest active regeneration next the active regeneration scheduled for the next turn is performed according to the second active regeneration schedule until the quantity of soot is smaller than that of the danger section, and then the active regeneration may be performed according to the adjusted second active regeneration schedule.

In the first active regeneration schedule adjusting operation of the regeneration controlling method for the diesel particulate filter of construction machinery according to the present disclosure, active regeneration scheduled at the earliest time may be advanced and performed according to the first active regeneration, even active regeneration of the next turn scheduled at the next earliest time after the active regeneration scheduled at the earliest time may be advanced and continuously performed according to the first active regeneration schedule, and thereafter the first active regeneration schedule may be adjusted so that active regeneration after the active regeneration for the next turn is performed according to the first active regeneration schedule and then a process may return to the first active regeneration operation.

In the first active regeneration schedule adjusting operation of the regeneration controlling method for the diesel particulate filter of construction machinery according to the present disclosure, the earliest active regeneration may be advanced and performed according to the first active regeneration schedule, and even active regeneration of the next turn of the earliest active regeneration may be advanced and continuously performed according to the first active regeneration schedule, and thereafter the first active regeneration schedule may be adjusted so that active regeneration of the next turn after the active regeneration for the next turn is performed and the first active regeneration operation may be performed.

Further, in the regeneration controlling method for the diesel particulate filter of construction machinery according to the present disclosure, the first active regeneration schedule may be an active regeneration schedule set considering a natural regeneration, and the second active regeneration schedule may be an active regeneration schedule set considering that a natural regeneration is not performed in the construction machinery.

Other detailed matters of the exemplary embodiments are included in the detailed description and the drawings.

According to the regeneration controlling method for the diesel particulate filter of construction machinery according to the present disclosure having the aforementioned configuration may perform regular active regeneration, and control so as to actively regenerate the DPF by discriminating a section according to the quantity of soot and actively changing a schedule of an active regeneration of the next turn. Accordingly, when the quantity of soot is still excessive even though the active regeneration is performed, the active regeneration may be continuously performed, or a schedule of an active regeneration of the next turn may be advanced and performed.

Further, the regeneration controlling method for the diesel particulate filter of construction machinery according to the present disclosure may timely implement the active regeneration of the DPF even in various types of construction machinery and various types of working environments by changing the schedule of the active regeneration based on the quantity of soot.

DESCRIPTION OF THE DRAWINGS

FIG. 1 is a diagram for describing a method for controlling regeneration of diesel particulate filter in construction machinery according to an exemplary embodiment of the present disclosure.

DESCRIPTION OF MAIN REFERENCE NUMERALS OF DRAWINGS

S10: First active generation step
S20: First determination step
S30: Second determination step
S40: Second active generation step
S50: Third determination step
S60: Third active generation step
S70: Manual active regeneration performance inducing step

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Advantages and characteristics of the present disclosure, and a method of achieving the advantages and characteristics will be clear with reference to an exemplary embodiment described below in detail together with the accompanying drawings.

Like reference numerals indicate like elements throughout the specification.

Further, the terms used in the description are defined considering the functions of the present disclosure and may vary depending on the intention or usual practice of a manufacturer. Therefore, the definitions should be made based on the entire contents of the present specification.

Hereinafter, a method for controlling regeneration of diesel particulate filter in construction machinery according to an exemplary embodiment of the present disclosure will be described with reference to FIG. 1.

FIG. 1 is a diagram for describing a method for controlling regeneration of diesel particulate filter in construction machinery according to an exemplary embodiment of the present disclosure.

A method for controlling regeneration of diesel particulate filter in construction machinery according to an exemplary embodiment of the present disclosure measures the quantity of soot immediately after performance of an active regeneration of a DPF, and changes a schedule of an active regeneration to be performed later according to the quantity of soot as illustrated in FIG. 1.

The quantity of soot may be measured by a sensor for detecting the quantity of soot, and the sensor employs a known technique, so a more detailed description thereof will be omitted.

When it is defined that a case where there is no soot is 0%, and a case where soot is fully filled in the DPF is 100%, the quantity of soot may be divided into an allowance section, a general section, and a danger section according to the quantity of soot.

Here, the allowance section may be a section in which the quantity of soot is 40% or lower, the general section may be a section in which the quantity of soot is larger than 40% and is equal to or smaller than 70%, and the danger section may be a section in which the quantity of soot exceeds 70% and is equal to or smaller than 80%.

The aforementioned numerical value may be changed according to preference of a worker, and the scope of the claim is not limited to the aforementioned numerical value, and the numerical value is suggested for helping the understanding of the technical spirit.

The regeneration controlling method for the diesel particulate filter (DPF) of construction machinery according to the exemplary embodiment of the present disclosure will be described for each step.

First active regeneration step S10: The DPF is actively regenerated according to a first active regeneration schedule set by a controller. The first active regeneration schedule is a schedule set by considering that a natural regeneration may be performed during driving of equipment.

First determination step S20: The quantity of soot is measured after the regular active regeneration schedule performing step S10, and when it is determined that the quantity of soot is within the allowance section, the process returns to the regular active regeneration schedule performing step S10.

Second determination step S30: When the quantity of soot is larger than that of the allowance section in the first determination step S20, it is determined whether the quantity of soot is within the general section.

Second active regeneration step S40: When the quantity of soot is smaller than that of the general section in the second determination step S30, the regular active regeneration schedule performing step is performed, and when the quantity of soot is within the general section, active regeneration scheduled at the earliest time is performed according to the first active regeneration schedule, and then the quantity of soot is determined again. In the active regeneration in the present step, the quantity of soot may be decreased by continuously performing the aforementioned active regeneration scheduled at the earliest time and active regeneration scheduled at the next earliest time. When the quantity of soot is smaller than that of the general section after continuously performing the two active regenerations, the first active regeneration schedule may be adjusted so that the first active regeneration schedule progresses after the two active regenerations, and then the process may return to the regular active regeneration schedule performing step S10 or the first determination step S20.

Third determination step S50: When the quantity of soot is larger than that of the general section in the second determination step S30, it is determined whether the quantity of soot is within the danger section.

Third active regeneration step S60: When the quantity of soot is within the danger section in the third determination step S50, a preferential active regeneration schedule is changed to a second active regeneration schedule. Here, the second active regeneration schedule is an active regeneration schedule set by considering that a natural regeneration is not performed in the construction machinery, and is set so that the active regeneration is often generated compared to the first active regeneration schedule. After the preferential active regeneration schedule is changed to the second active regeneration schedule, active regeneration scheduled at the earliest time according to the second active regeneration schedule is first performed, and the quantity of soot is determined. When the quantity of soot is smaller than that of the danger section, the active regeneration schedule is changed to the first active regeneration schedule again, and the process returns to the first active regeneration step S10 or the first determination step S20, and when the quantity of soot is within the danger section, the active regeneration is performed according to the prior second active regeneration schedule until the quantity of soot is smaller than that of the danger section. In order to more rapidly decrease the quantity of soot, in the present exemplary embodiment, after the active regeneration scheduled at the earliest time according to the second active regeneration schedule is performed, the active regeneration scheduled at the next earliest time is continuously performed. Even in this case, when the quantity of soot is within the danger section, the active regeneration is performed according to the second active regeneration schedule, in such a way that the active regeneration is performed from the earliest active regeneration after the prior two-times active regenerations.

That is, the active regeneration schedule may be actively changed according to the quantity of soot through the first and second active regeneration steps S40 and S60.

Manual active regeneration performance inducing step S70: When the quantity of soot is larger than that of the danger section in the third determination step (S50), the performance of manual active regeneration is induced by outputting the manual active regeneration schedule with a visual or auditory alarm.

The regeneration controlling method for the diesel particulate filter of construction machinery according to the exemplary embodiment of the present disclosure having the aforementioned configuration may control so as to actively regenerate the DPF by dividing the quantity of soot into the sections according to the quantity of soot, performing a regular active regeneration, and actively changing a schedule of the active regeneration for the next turn.

Accordingly, when the quantity of soot is still excessive even though the active regeneration is performed, the active regeneration may be continuously performed, or a schedule of an active regeneration of the next turn may be advanced and performed.

Further, the regeneration controlling method for the diesel particulate filter of construction machinery according to the exemplary embodiment of the present disclosure may timely implement the active regeneration of the DPF even in various types of construction machinery and various types of working environments by changing the schedule of the active regeneration based on the quantity of soot.

Further, the regeneration controlling method for the diesel particulate filter of construction machinery according to the exemplary embodiment of the present disclosure may protect the DPF and implement the reasonable regeneration control of the DPF by performing the active regeneration for each section according to the quantity of soot.

The exemplary embodiments of the present disclosure have been described with reference to the accompanying drawings, but those skilled in the art will understand that the present disclosure may be implemented in another specific form without changing the technical spirit or an essential feature thereof.

Accordingly, it will be understood that the aforementioned exemplary embodiments are described for illustration in all aspects and are not limited, and the scope of the present disclosure shall be represented by the claims to be described below, and all of the changes or modified forms induced from the meaning and the scope of the claims, and an equivalent concept thereof are included in the scope of the present disclosure.

The regeneration controlling method for the diesel particulate filter of construction machinery according to the present disclosure may be used for actively regenerating a diesel particulate filter (DPF).

Although the present disclosure has been described with reference to exemplary and preferred embodiments, workers skilled in the art will recognize that changes may be made in form and detail without departing from the spirit and scope of the disclosure.

The invention claimed is:

1. A method for controlling regeneration of a diesel particulate filter in construction machinery, comprising:
   a first active regeneration operation of actively regenerating a diesel particulate filter (DPF) according to a predetermined first active regeneration schedule when a quantity of soot inside the DPF is within a predetermined allowance section;
   a second active regeneration operation of actively regenerating the diesel particulate filter according to a second active regeneration schedule, which is different from the first active regeneration schedule, according to the quantity of soot when the quantity of soot is within a general section larger than that of the allowance section or a danger section larger than that of the general section; and
   a manual active regeneration performance inducing operation of inducing performance of a manual active regeneration when the quantity of soot exceeds the danger section,
   wherein the second active regeneration operation includes a second active regeneration schedule adjusting operation of performing an active regeneration until the quantity of soot is smaller than that of the danger section according to a second active regeneration schedule set to be earlier than the first active regeneration schedule when the quantity of soot is within the danger section.

2. The regeneration controlling method of claim 1, wherein the second active regeneration operation includes a first active regeneration schedule adjusting operation of rescheduling a first active regeneration to an earliest time according to the first active regeneration schedule to immediately perform the first active regeneration when the quantity of soot is within the general section.

3. The regeneration controlling method of claim 1, wherein in the second active regeneration schedule adjusting operation, a given active regeneration corresponding to the earliest time of the second active regeneration schedule is performed, wherein the given active regeneration corresponding to the earliest time can be an active regeneration scheduled for a next turn of the active regeneration which is advanced and continuously performed according to the second active regeneration schedule, and thereafter the second active regeneration schedule is adjusted so that a next earliest active regeneration scheduled for the next turn is performed according to the second active regeneration schedule until the quantity of soot is smaller than that of the danger section, and then the active regeneration is next performed according to the adjusted second active regeneration schedule.

4. The regeneration controlling method of claim 2, wherein in the first active regeneration schedule adjusting operation, the first active regeneration scheduled at the earliest time is advanced and performed immediately according to the first active regeneration schedule, and thereafter the first active regeneration schedule is adjusted so that a second active regeneration after the first active regeneration is also immediately performed according to the first active regeneration schedule, and then a process returns to the first active regeneration operation.

5. The regeneration controlling method of claim 2, wherein in the first active regeneration schedule adjusting operation, the first active regeneration of the first active regeneration schedule is advanced and immediately performed according to the first active regeneration schedule, and a next turn of the first active regeneration of the first active regeneration schedule is also advanced and continuously performed according to the first active regeneration schedule.

6. The regeneration controlling method of claim 1, wherein the first active regeneration schedule is an active regeneration schedule set considering a natural regeneration, and the second active regeneration schedule is an active regeneration schedule set considering that a natural regeneration is not performed in the construction machinery.

\* \* \* \* \*